(12) United States Patent
Escutia Garcia et al.

(10) Patent No.: US 10,901,830 B2
(45) Date of Patent: Jan. 26, 2021

(54) ELECTRONIC CHECKLIST

(71) Applicant: International Business Machines Corporation, Armonk, NY (US)

(72) Inventors: Patricia Escutia Garcia, Mexico City (MX); Romero Sarabia Enrique Andres, Mexico State (MX)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 16/027,884

(22) Filed: Jul. 5, 2018

(65) Prior Publication Data

US 2020/0012548 A1 Jan. 9, 2020

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0778* (2013.01); *G06F 11/0793* (2013.01)

(58) Field of Classification Search
CPC .. G06F 11/07; G06F 11/0709; G06F 11/0751; G06F 11/0778; G06F 11/079; G06F 11/0793
See application file for complete search history.

(56) References Cited

U.S. PATENT DOCUMENTS

| | | | |
|---|---|---|---|
| 7,469,287 B1 * | 12/2008 | Castillo | H04L 41/0663 709/224 |
| 7,757,213 B2 | 7/2010 | Fusaro et al. | |
| 7,954,014 B2 | 5/2011 | Wang et al. | |
| 8,161,323 B2 * | 4/2012 | Kuchibhotla | G06F 11/0748 714/25 |
| 8,418,001 B2 | 4/2013 | Knorl et al. | |
| 9,480,163 B2 | 10/2016 | Kessler et al. | |
| 9,542,259 B1 | 1/2017 | McEwen et al. | |
| 9,871,712 B1 * | 1/2018 | Sorenson, III | H04L 43/0817 |
| 9,886,338 B1 * | 2/2018 | Khokhar | G06F 11/34 |
| 10,048,996 B1 * | 8/2018 | Bell | G06F 11/3452 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Matthew M Kim
*Assistant Examiner* — Kurosu Risa Altaf
(74) *Attorney, Agent, or Firm* — Heslin Rothenberg Farley & Mesiti P.C.; Michael A. Petrocelli, Esq.

(57) ABSTRACT

A method, computer program product, and a system where a processor(s) obtains data comprising issues and respective issue resolution plans for the issues experienced in a distributed computing system. The processor(s) cognitively analyzes the data to identify components of the distributed computing system for status evaluation and generates a script to perform a health check on the components and to automatically resolve performance issues of the components identified during the health check. The processor(s) executes the script, where for each component, the processor(s) determined if a status of the component indicates a performance issue and if not, update the data utilized in the cognitive analysis. If yes, the processor(s) attempts to resolve the status and updates the data with the results.

17 Claims, 12 Drawing Sheets

(56) References Cited

U.S. PATENT DOCUMENTS

| | | |
|---|---|---|
| 10,310,904 B2 | 6/2019 | Cowling et al. |
| 2005/0223285 A1* | 10/2005 | Faihe .................. G06F 11/0709 |
| | | 714/25 |
| 2008/0313345 A1* | 12/2008 | Bernardin ............... G06F 9/505 |
| | | 709/235 |
| 2016/0034337 A1 | 2/2016 | Sevilmis et al. |
| 2016/0132372 A1 | 5/2016 | Anderson et al. |
| 2016/0156671 A1* | 6/2016 | Cabrera .................. H04L 63/20 |
| | | 726/1 |
| 2019/0095470 A1* | 3/2019 | Dundjerski ......... G06F 11/0757 |

OTHER PUBLICATIONS

Accelerite: "Advanced Endpoint Management System and Security", https://accelerite.com/wp-content/uploads/2017/01/Accelerite-Whitepaper-Real-Time-Endpoint-Insights.pdf, 8 pages.

Moriyama et al. "Quality Checklist System", Fujitsu Ten Technical Journal, F. No. 18(2002), 7 pages.

\* cited by examiner

ELECTRONIC CHECKLIST

BACKGROUND

As computing systems become more complex, and the resources utilized by a given user become less centralized, issues can occur within computing systems that affect efficiency, but are difficult both to diagnose as well as to resolve. To counteract the growing complexity (and interconnectivity) of software and hardware systems utilized in given computing environments, automated and consistent approaches to fault mitigation become more central to maintaining computing system health and efficiency. Although part of an approach to system health involves analyzing and diagnosing issues, issues would arguably be reduced through regular evaluations of system components and an ability to evaluate and solve issues in a cohesive and consistent manner.

SUMMARY

Shortcomings of the prior art are overcome and additional advantages are provided through the provision of a method for anticipating and mitigating issue in a distributed computing environment. The method includes, for instance: obtaining, by the one or more processors, data comprising issues and respective issue resolution plans for the issues experienced in a distributed computing system; cognitively analyzing, by the one or more processors, the data to identify components of the distributed computing system for status evaluation, wherein the identifying is based on recognizing patterns in the data through the cognitive analysis; based on identifying the components, generating, by the one or more processors, based on the cognitive analysis and on the data, a script to perform a health check on the components and to automatically resolve performance issues of the components identified during the health check; executing, by the one or more processors, the script, wherein the executing comprises, for each components of the components identified in the script: determining, by the one or more processors, by performing a health check on the component, if a status of the component indicates a performance issue; based on determining that the status of the component does not indicate a performance issue, updating, by the one or more processors, a certain portion of the data utilized in the cognitive analysis, wherein the portion is relevant to one or more of the status, the procedures, or the component; based on determining that the status of the component does indicates a performance issue, attempting, by the one or more processors, to resolve the status, the attempting comprising: utilizing procedures in the script based on the data comprising the issues and the respective issue resolution plans relevant to the component; determining, by the one or more processors, if the status was resolved by the procedures; based on determining that the procedures resolved the status, updating, by the one or more processors, a portion of the data utilized in the cognitive analysis, wherein the portion is relevant to one or more of the status, the procedures, or the component; and based on determining that the procedures did not resolve the status, logging, by the one or more processors, one or more errors related to the status, and updating, by the one or more processors, the portion of the data.

Shortcomings of the prior art are overcome and additional advantages are provided through the provision of a computer program product for anticipating and mitigating issues in a distributed computing system. The computer program product comprises a storage medium readable by a processing circuit and storing instructions for execution by the processing circuit for performing a method. The method includes, for instance: obtaining, by the one or more processors, data comprising issues and respective issue resolution plans for the issues experienced in a distributed computing system; cognitively analyzing, by the one or more processors, the data to identify components of the distributed computing system for status evaluation, wherein the identifying is based on recognizing patterns in the data through the cognitive analysis; based on identifying the components, generating, by the one or more processors, based on the cognitive analysis and on the data, a script to perform a health check on the components and to automatically resolve performance issues of the components identified during the health check; executing, by the one or more processors, the script, wherein the executing comprises, for each components of the components identified in the script: determining, by the one or more processors, by performing a health check on the component, if a status of the component indicates a performance issue; based on determining that the status of the component does not indicate a performance issue, updating, by the one or more processors, a certain portion of the data utilized in the cognitive analysis, wherein the portion is relevant to one or more of the status, the procedures, or the component; based on determining that the status of the component does indicates a performance issue, attempting, by the one or more processors, to resolve the status, the attempting comprising: utilizing procedures in the script based on the data comprising the issues and the respective issue resolution plans relevant to the component; determining, by the one or more processors, if the status was resolved by the procedures; based on determining that the procedures resolved the status, updating, by the one or more processors, a portion of the data utilized in the cognitive analysis, wherein the portion is relevant to one or more of the status, the procedures, or the component; and based on determining that the procedures did not resolve the status, logging, by the one or more processors, one or more errors related to the status, and updating, by the one or more processors, the portion of the data.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
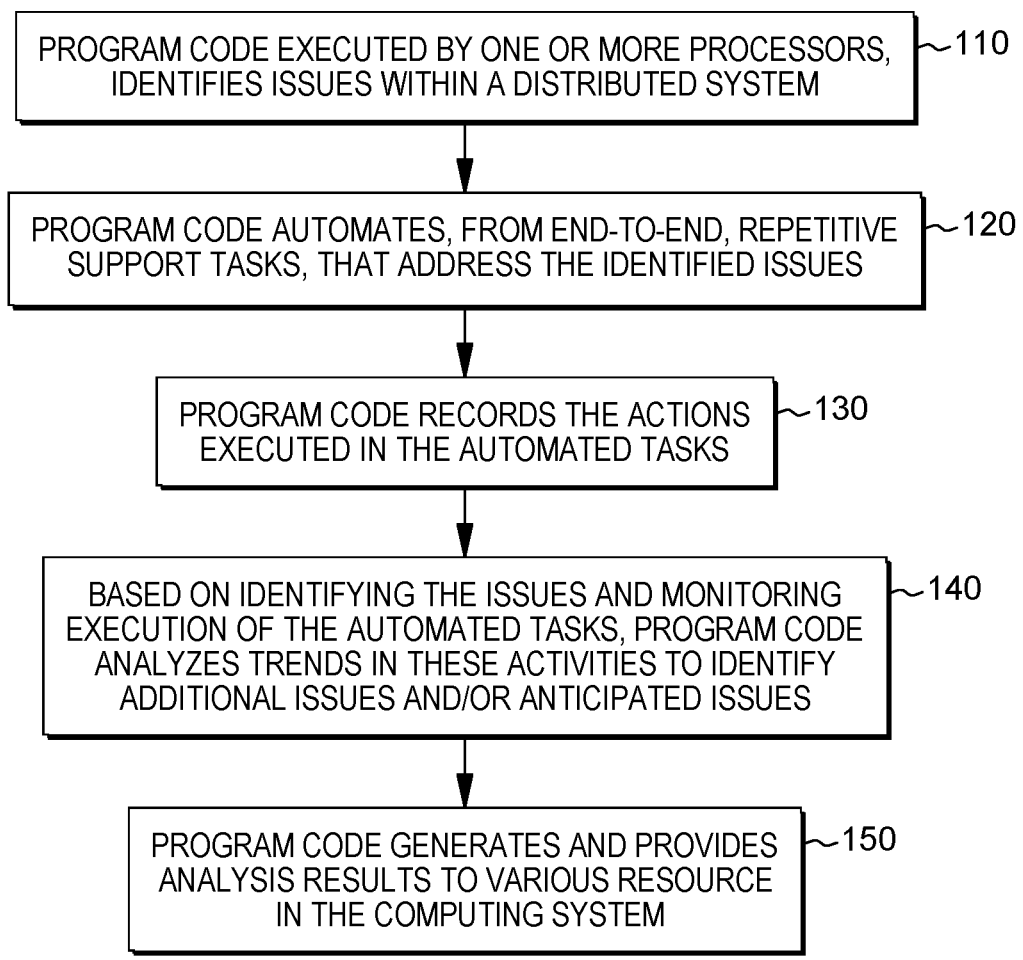
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 11:
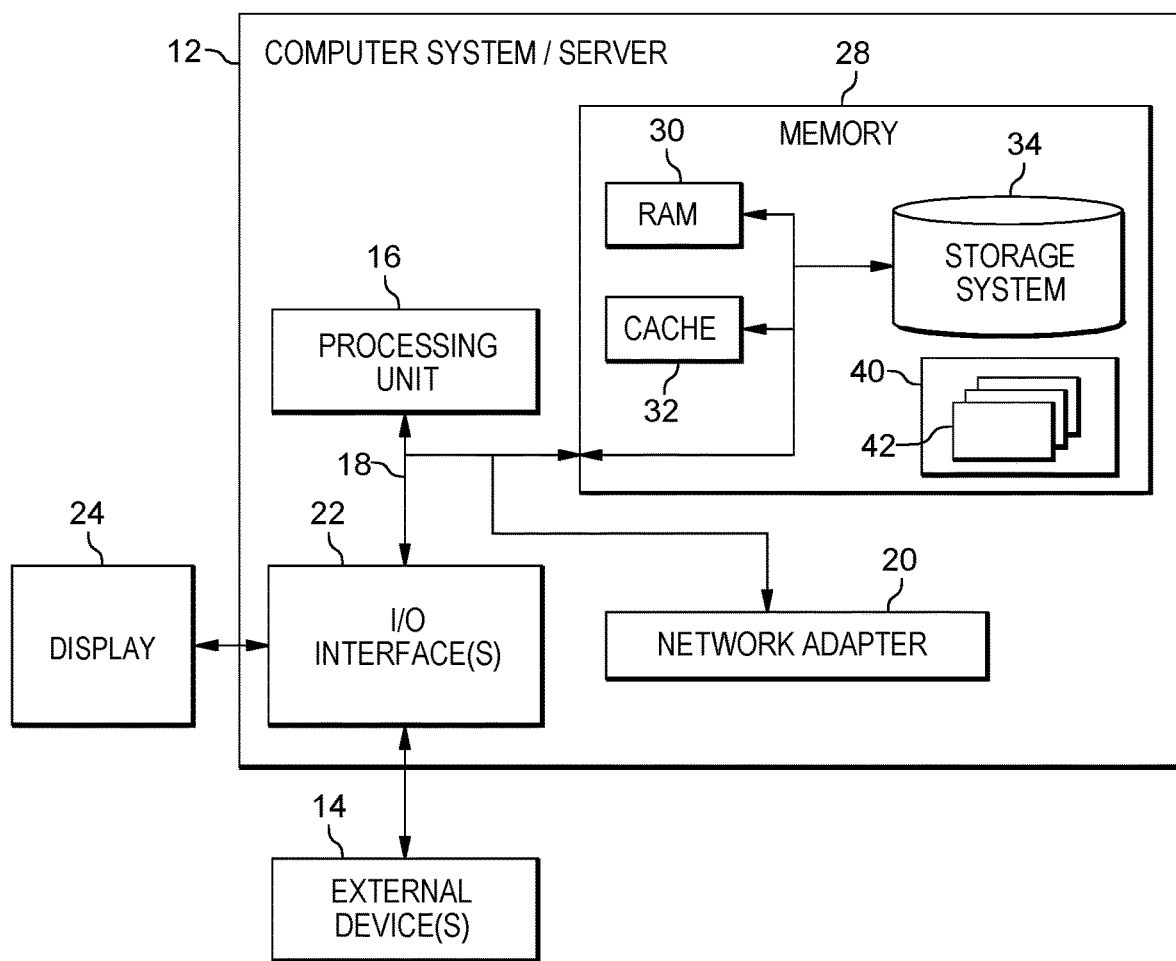
FIG. 11 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 11 as program/utility 40, having a set (at least one) of program modules 42, may be stored in memory 28.

Embodiments of the present invention include a computer-implemented method, a computer program product, and a computer system that include program code executed on at least one processing circuit that generates a process (referred to herein as an electronic checklist), for mitigating issues, both existing and predicted, with various components, in a distributed computing system, including, but not limited to, a cloud computing environment. In some embodiments of the present invention, program code executing on at least one processing circuit performs a cognitive analysis, determines an issue exists, and identifies a solution for the issue. In some embodiments of the present invention, the program code may interfaces with an existing cognitive analysis tool and solution database in order to obtain this data. Based on receiving or diagnosing the issue in a cognitive analysis, and identifying a solution, the program code identifies a component for testing. In some embodiments, the program code identifies the component as being related to one or more of the issue and/or the solution (e.g., per an existing solution database). In some embodiments of the present invention, the program code performs a test on the identified component to determine the status of the component, including, optionally, whether the status of the component is correct. Based on determining that the status is correct (e.g., correctly reflected in network security and health tools), the program code collects predetermined data associated with the component. The program code updates the aforementioned cognitive tool and/or solution database with the pattern information. Alternatively, if the program code determines that the status of the component is not correct, the program code applies a fix to the component. The program code verifies (e.g., by running analytics on the component or calling an analytics systems to run the analytics) that the fix is successful and collects the current predetermined data associated with the component (in its now corrected state). In some embodiments of the present invention, the program code updates the aforementioned cognitive tool and/or solution database with the pattern information. If the program code determines that the fix is not successful, the program code registers an error and updates the aforementioned cognitive tool and/or solution database with the pattern information related to the error. The regular updates to the data provide a machine learning capability that enables the process to increase in efficacy and efficiency through repeated use.

Aspects of embodiments of the present invention represent improvements over existing health check and mitigation technologies for computing systems at least because, in embodiments of the present invention (in contrast to existing approaches): 1) program code (executed by a processing resource in an embodiment of the present invention) continuously updates solution patterns (e.g., machine learns solution patterns); 2) program code identifies and memorializes (for use in mitigation) solution patterns for other components that may fail after the program code performs an analysis of known errors and solutions; and 3) program code utilizes a cognitive, rather than a manual, method of mitigating software errors.

Distributed computing systems, due to their complexity and the multiplicity of software and hardware systems that comprise these systems, are prone to experiencing various issues, which embodiments of the present invention address by providing automated approaches for mitigating these issues. The type of system issues addressed by the program code in various embodiments of the present invention include, but are not limited to: a high volume of software incidents (Operating Systems (OS), applications), a High Mean Time To Resolve (MTTR) being required to fix software incidents, a computer policy not standardized throughout a given environment and/or not implemented consistently or at all, a missing computer standard application configuration, and inconsistency in asset management inventory reconciliation processes, and/or information with errors or incomplete information. Existing approaches to these types of issues are largely manual and can create high user call volume to a service desk to report software incidents, which reduce users' productivity time. Addressing these issues manually can be costly, including the labor costs incurred by moving personnel to fix an issue on a given site. Thus, a need exists for preventive and proactive actions to avoid service disruptions, which are provided by one or more automated scripts in embodiments of the present invention.

Embodiments of the present invention include the generation and implementation of an automated script that provides an end-to-end solution process for system issues. This automated script can be understood as filling in gaps in existing computer resource assistance tools and allowing these tools to work together, in an automated fashion, to provide an enterprise solution. Thus, utilizing embodiments of the present invention in concert with existing tools results in a computer-implemented method, computer program product, and/or computer system that is arguably greater than the sum of its parts.

Two types of systems that program code in embodiments of the present invention interfaces with, in some embodiments of the present invention, in order to provide automated end-to-end solutions, include cognitive analysis tools and physical assets management tools. For example, in some embodiments of the present invention, the program code interfaces with the application programming interfaces (APIs) that are part of a known cognitive agent, such as the IBM Watson® Application Program Interface (API), a product of International Business Machines Corporation, to identify an issue. IBM Watson® is a registered trademark of International Business Machines Corporation, Armonk, N.Y., US. Program code in some embodiments of the present invention interfaces with asset management tools, such as Maximo®. Maximo® is a registered trademark of International Business Machines Corporation, Armonk, N.Y., US. Maximo is a comprehensive solution for managing physical assets on a common platform. Maximo provides one or more programs that maintain all asset types, including checking the health of assets health in real time, in order to streamline global operations, from procurement to contract management, in a distributed system that may include one or more physical locations, and/or comprised of virtual assets in the cloud.

Aspects of various embodiments of the present invention are both inextricably tied to computing and provide significantly more than existing technologies, for providing an automated issue mitigation solution in a distributed computing system. Embodiments of the present invention are inextricably tied to computing, at least because the program code generates and executes a single script that provides a comprehensive, end-to-end, solution to an issue experienced within a distributed computing environment. Because of the interconnectivity of the resources in the computing environment, the program code does not only obtain, diagnose, and address an issue, the program code can additionally machine learn from each execution in order to generate more efficient automated processes, to improve system efficacy moving forward. Embodiments of the present invention include aspects that provide significantly more than existing technologies at least because the automation and seamlessness of the approach provided eliminates inefficiencies in existing approaches, such as required manual interventions, which are not only expensive, from a system accessibility perspective, but are also create downtime in systems. Thus, the interconnectivity offered by aspects of embodiments of the present invention reduces maintenance of complex systems into a single, comprehensive, automated, script. This approach is more efficient than utilizing various systems separately and attempting to understand the systems as a whole, when each system only provides a slice of information.

Embodiments of the present invention provide advantages over existing system monitoring and maintenance approaches because of the simplicity and flexibility with which aspects of the present invention may be implemented. Some embodiments of the present invention include a single script that includes modular and customizable functions. Embodiments of the present invention can be utilized across systems and platforms, while other system health applications are generally limited to certain compatible platforms for which they were designed. These existing applications also cannot interface with various other systems to create an end-to-end solution. For example, Proactive Endpoint Management (PEM), is a health check solution that is designed to work exclusively with Microsoft System Center Configuration Manager and therefore does not have the flexible of embodiments of the present invention. Embodiments of the present invention include all the functionality of systems like PEM, but also interface with unlimited services and applications to provide a more robust solution. For example, embodiments of the present invention interface with cognitive analytics provider Watson, as well as with support tools, including but not limited to, Bravo, Maximo, and/or antivirus and patching tools. Also, rather than being limited to the health check functionality of approaches like PEM, embodiments of the present invention are customizable for various Operating Systems and can also include functionality outside of health-check systems, including but not limited to: asset inventory monitoring, options to install/uninstall/reinstall software automatically, manual execution of components, and/or a printing module.

Embodiments of the present invention are additionally flexible (beyond existing systems) because aspects of the embodiments are implemented across a variety of technical environments and can be executed either manually or in a silent mode (e.g., as a background process). For example, the script of the present invention may be executed from different platforms (e.g., mobile, server environment, corporate or public cloud), in accordance with the security standards of the platforms. Because embodiments of the present invention offer a comprehensive and cohesive all-in-one solution, no additional investment is needed to implement different programs to perform a health check, ensure that the computing resources meet compliance computer policies, and/or run an electronic wall-to-wall inventory process. Some embodiments of the present invention can be easily augmented and improved because the program code generates the scripts modularly, which allows the program code to add improvements, separately, reducing code development and implementation times. Thus, a single implementation of a given embodiment can include a single script that may support operative tasks of different delivery areas.

FIG. 1 is a basic overview of a workflow 100 of some embodiments of the present invention. This basic overview will be expanded upon in further detail in later figures, including FIG. 7. As explained above, in some embodiments of the present invention, the program code generates an automated script to address issues located by existing system monitoring and maintenance tools. In embodiments of the present invention, program code executed by one or more processors, identifies issues within a distributed system (110). The program code automates, from end-to-end, repetitive support tasks, that address the identified issues (120). Repetitive tasks include, but are not limited to, implementing an antivirus and/or a patch solve the issues found. The program code records the actions executed in the automated tasks (130). In some embodiments of the present invention, the program code may communicate with an existing asset management system, including but not limited to, Maximo, to record the actions. Based on identifying the issues and monitoring execution of the automated tasks, the program code analyzes trends in these activities to identify additional issues and/or anticipated issues (140).

In some embodiments of the present invention, the program code identifies current and potential software and application failures. In some embodiments of the present invention, based on analyzing trends for issues and addressing these issues, the program code machine learns when certain issues can be anticipated, thus, enabling the program code to avoid further incidents by anticipating certain incidents before they occurs and implementing proactive actions. The program code can also acquire hardware information to initiate refresh actions, as needed. In some embodiments of the present invention, as a result of analyzing an issue, the program code generates a report that can be provided to another resource to take action to mitigate an issue. For example, in some embodiments of the present invention, a resource specific to mitigating issues in the operating system receives and analyzes the report generated by the program code.

Returning to FIG. 1, in some embodiments of the present invention, the program code generates and provides analysis results to various resource in the computing system (150). As understood by one of skill in the art, because a variety of resources in the system will receive these results, the program code may provide results to the various resources in a variety of formats.

Figure 2:
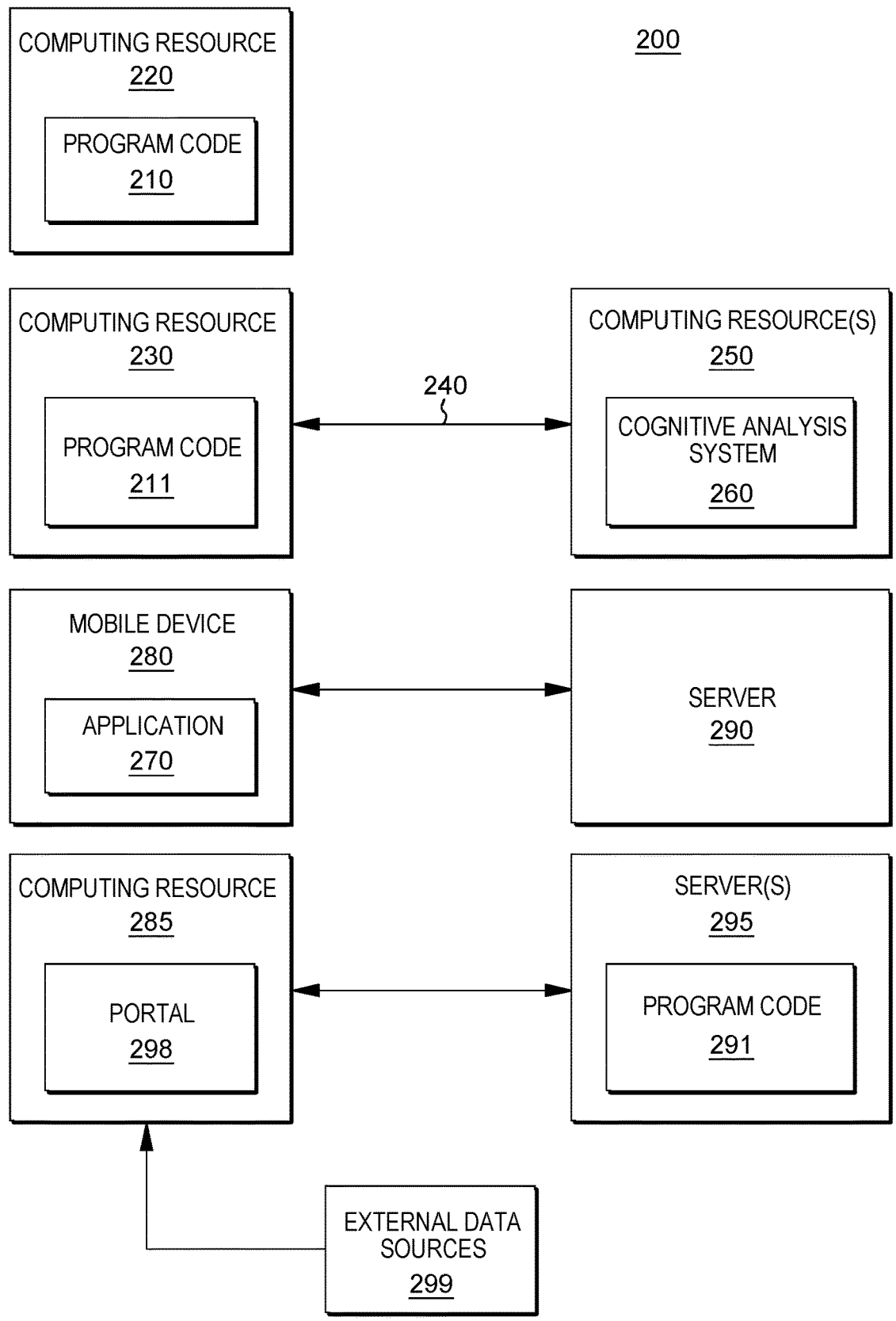
FIG. 2 is an illustration of various aspects of an environment in which aspects of embodiments of the present invention may be implemented.

Some embodiments of the present invention comprise a single script (program code executed by a processing resource), but the implementation of the single script can vary based on the technical environment. FIG. 2 is a technical environment 200 that includes resources of a distributed system, where various implementations of the present invention are provided. Although all these implementations may not be the most efficient approach in a single distributed system, FIG. 2 is provided to demonstrate the diversity of implementation possibilities. Further details of these implementations are described in FIGS. 3-6.

Referring to FIG. 2, embodiments of the present invention may be implemented as a basic version that provides a semi-automated solution (e.g., for issue mitigation in computing resources utilized by a given entity, such as a business or organization). This basic implementation is provided as program code 210 on a computing resource 220 in the technical environment 200. The program code 210 executes on the computing resource 220 and does not interface with external systems in the technical environment 200.

Figure 3:
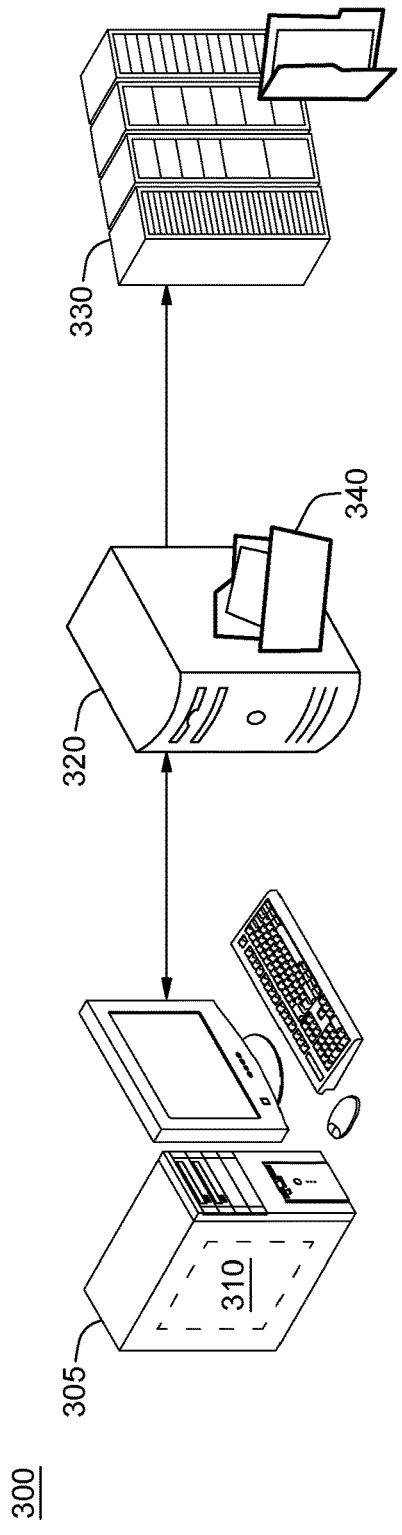
FIG. 3 is an illustration of various aspects of an environment in which aspects of embodiments of the present invention may be implemented.

FIG. 3 is a more detailed illustration of an implementation 300 of a basic version of an embodiment of the present invention. As illustrated in FIG. 3, program code comprising the script is executed by an agent 310 executed by a processing resource of a computing node 305. The results of a health and asset check executed by the script are provided by the program code to a cognitive analysis tool 330 (a tool providing predictive trend analysis and customized reporting), as a flat file 340 (e.g., CSV file). The program code of the agent 310 deposits the data as log information on a server 320.

Returning to FIG. 2, a second implementation, understood as a full version (due to components beyond the basic version), of the present invention, accessible via a computing resource 230 executing program code 211, includes an automated interface 240, with one or more resources 250 executing a cognitive analysis system (e.g., Watson) 260. This implementation enables the program code to send automated tasks to support tools (e.g., the cognitive analysis system 260), for environments, with no infrastructure limitations.

Figure 4:
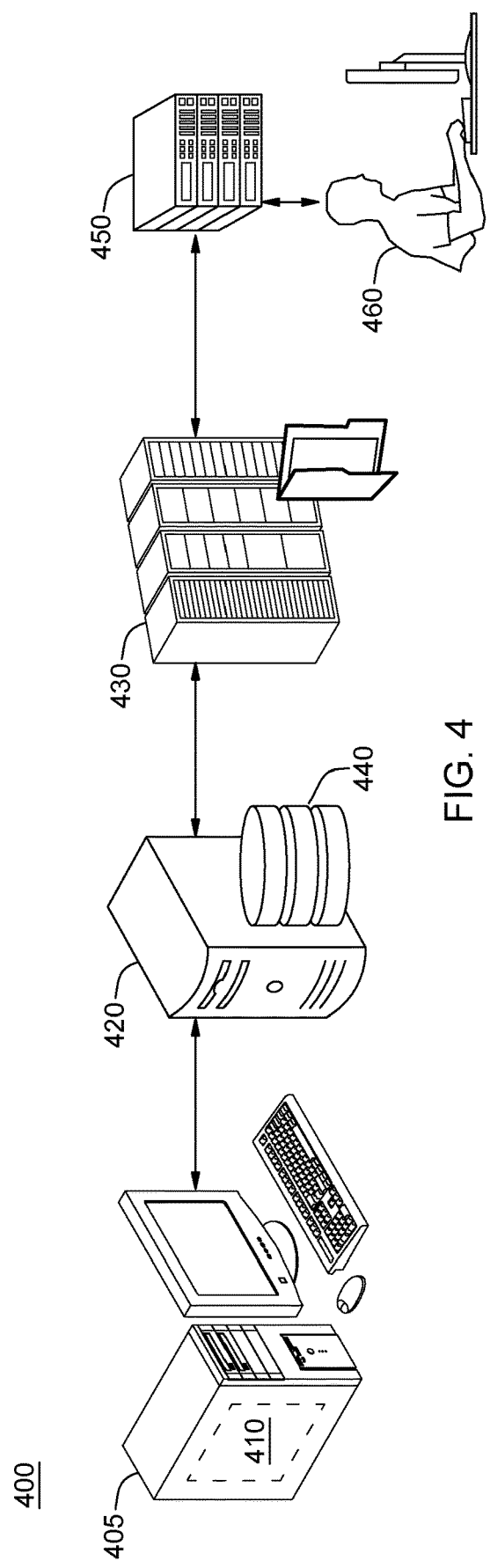
FIG. 4 is an illustration of various aspects of an environment in which aspects of embodiments of the present invention may be implemented.

FIG. 4 is a more detailed illustration of an implementation 400 of a full version of an embodiment of the present invention. As with the basic version of FIGS. 2-3, in FIG. 4, program code comprising the checklist script runs as an agent 410 on a computing resource 405, logging results to a server 420, in a flat file and/or relational database 440. The program code provides, via the server 420, the data obtained during script execution to a cognitive analysis tool 430 (e.g., Watson). The program code of the cognitive analysis tool performs predictive trend analysis and generates reports. Based on the results of the cognitive analysis, the program code communicates with support tools via a communications connection 450 to the support tools, which may be understood as tool connectors from which the program code can send and receive data/instructions for actions. In some embodiments of the present invention, the program code provides certain of the support tools with portions of the reports, generated by the cognitive analysis tool 430. Based on the communications, the program code implements various fixes, including but not limited to, antivirus updates and patches. In some embodiments of the present invention, the program code also provides updated information to asset and inventory analysis systems and technical support systems. Based on the information provided to the latter, the technical support system generates and transmits a ticket to a resource 460 of support personnel, requesting that the support personnel mitigate an issue realized through the analysis by the program code.

Returning to FIG. 2, a third implementation is a mobile application 270 executing and/or accessible (e.g., via a browser) on a mobile computing device 280 (i.e., a mobile version). This implementation is accessible by downloading an application (or an interface to an application available as a service), through an application provider, utilizing a connection (e.g., Internet) to a server 290. A user interacting with the mobile application 270, which may include a graphical user interface, can utilize various features including, but not limited to, performing a health check and/or requesting asset inventory data of computing resources in the technical environment 200. This example of the mobile application 270 also provides an interface to a ticketing system, so the user can enter a service request (e.g., based on health check results). For example, in some embodiments of the present invention, the program code interfaces with other applications executing on the mobile computing device 280 in order to provide the user with notifications through a common interface. In some embodiments of the present invention, a user receives notifications associated with the script of the invention through a social media and/or messaging application, including but not limited to, Twitter and/or Instagram.

Figure 5:
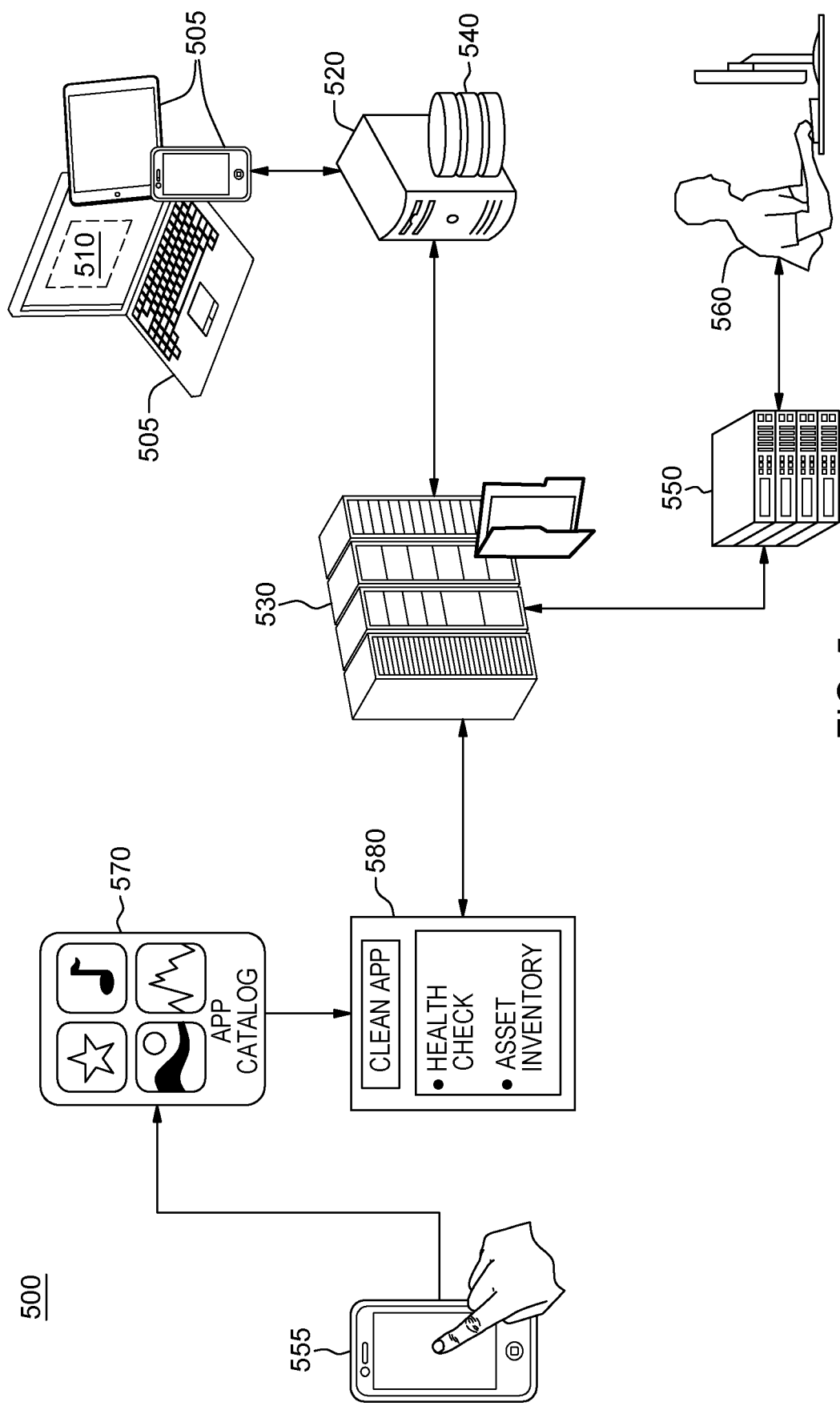
FIG. 5 is an illustration of various aspects of an environment in which aspects of embodiments of the present invention may be implemented.

FIG. 5 is a more detailed illustration of an implementation 500 of a mobile version of an embodiment of the present invention. The checklist application 580 is accessible, meaning some functionality is viewable, utilizing a mobile device 555. The user of the mobile device 555 interacts with (or executes) the checklist application 580 utilizing a web-enabled interface, such as a browser or other thin client. Program code comprising the checklist script runs on a computing resource 560, in the application 580, logging results to the server 520 in a flat file and/or relational database 540. The program code provides, via the server 520, the data obtained, during script execution, to a cognitive analysis tool 530. In some embodiments of the present invention, the server 520 executes an administrative console, which an administrator can access to customize various functionality. Many of the administrative aspects of embodiments of the present invention will be discussed in reference to FIG. 9.

Returning to FIG. 5, in addition to obtaining data from the script execution, the cognitive analysis tool 530 also obtains data from one or more additional external sources, including but not limited to, an application catalog 570 on the mobile device 555. In addition to obtaining data from the mobile device 555, the cognitive analysis tool 530 accumulates data provided by the execution of various agent 510 executing on computing resources 505. The program code of the cognitive analysis tool 530 performs predictive trend analyses and generate reports, in some embodiments of the present invention. Based on the results of the cognitive analysis, the program code communicates with support tools, via a communications connection 550. Based on the communications, the program code implements various fixes, including but not limited to, antivirus updates and patches. The program code also provides updated information to asset and inventory analysis systems and technical support systems. Based on the information provided to the latter, the technical support system can generate and transmit a ticket to a resource 560 of support personnel, requesting that the support personnel mitigate an issue realized through the analysis by the program code.

Returning to FIG. 2, a fourth implementation of some embodiments of the present invention enables a user to benefit from the functionality offered by the various aspects without installing an application on a computing resource. Rather, the user utilizes a computing resource 285 to connect to one or more servers 295 executing the program code 291, via a portal 298. Through the portal 298, a user can trigger the execution of the script. For example, a user may utilize the portal 298 to run a health check and obtain asset inventory options. The user may receive the results of requests entered via the portal 298 via other electronic means, i.e., from external data sources 299, including but not limited to, email address, SMS message, or through a social media interface, such as Twitter.

Figure 6:
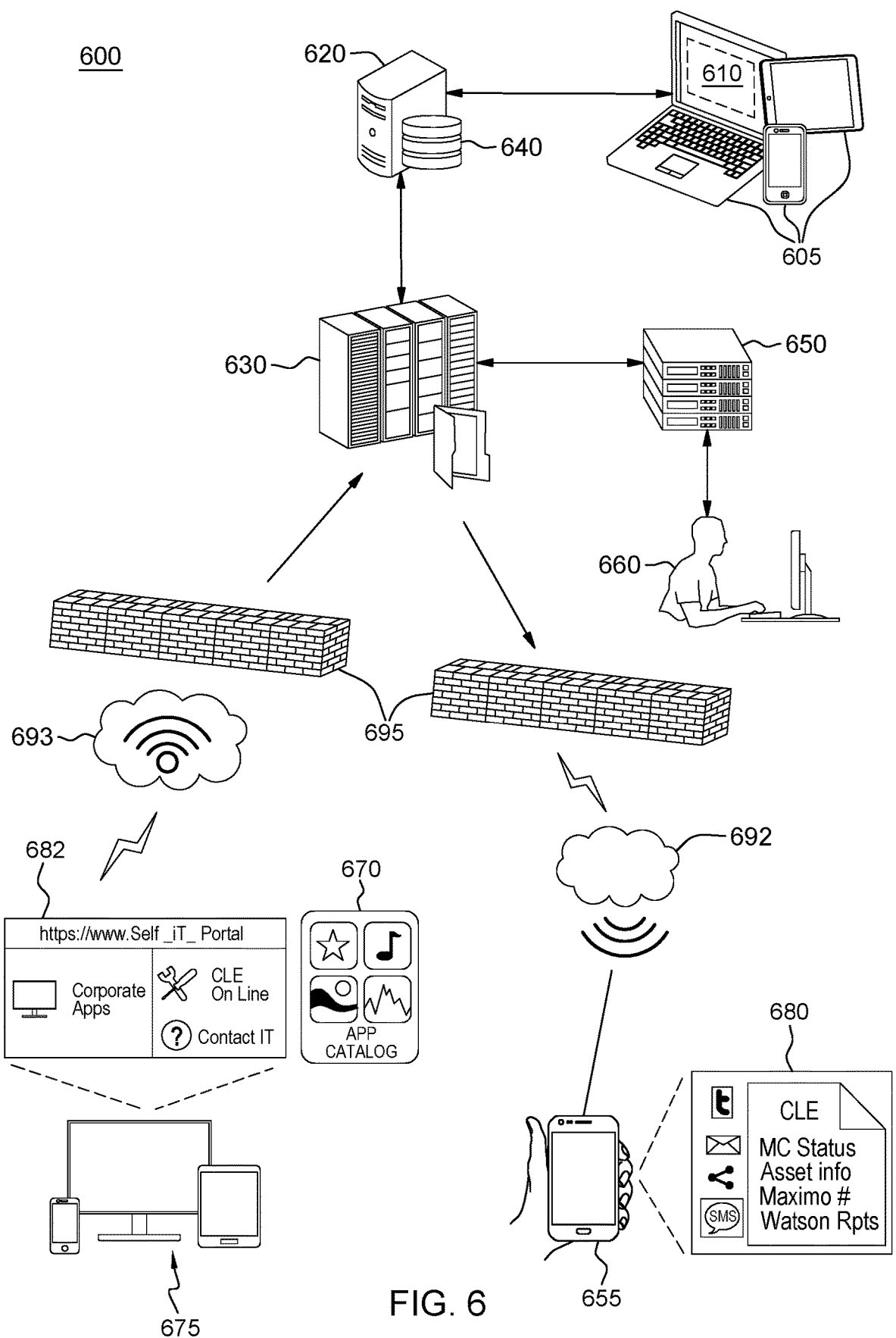
FIG. 6 is an illustration of various aspects of an environment in which aspects of embodiments of the present invention may be implemented.

FIG. 6 is a more detailed illustration of an implementation 600 of a portal version of an embodiment of the present invention. As illustrated in FIG. 6, many of the components are equivalent to those in the earlier implementations. However, in this implementation 600, many elements of the present invention are accessible from behind a firewall 695, so the implementation may be localized to a physical environment behind the firewall 695. In some embodiments of the present invention, certain resources 693 are accessible without clearing the security of the firewall 695 and assist with forming connections. The functionality of the checklist script, including the results, can be accessed via a device 675, in a portal interface 682. FIG. 6 also shows that aspects of a mobile version of the present invention are compatible in this environment, such as utilizing a mobile device 655 to access the checklist application. The connection of the mobile device 655 is through the Internet 692, and also accessed resources behind a firewall 695.

The various implementation in FIG. 2 can be implemented in one or more of an unattended mode and/or a manual mode. The unattended mode is a silent mode, where the user or a process configures the program code to scan the resources of the technical environment 200 with a given frequency (e.g., hourly, daily, weekly, monthly, at a set date/time). In a manual or on-demand mode, the program code responds to requests to execute the script ad hoc.

Figure 7:
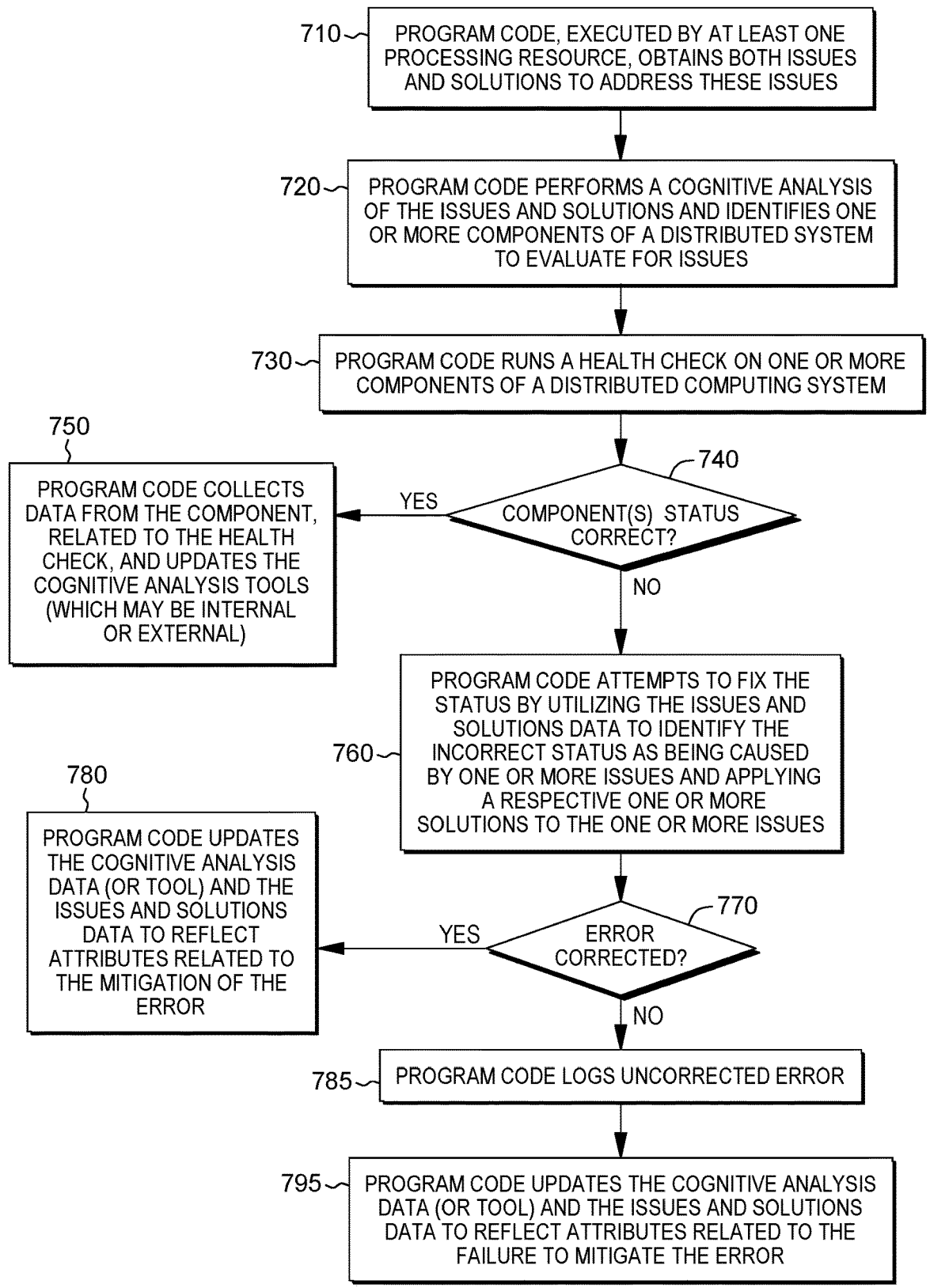
FIG. 7 is a workflow illustrating certain aspects of an embodiment of the present invention.

FIG. 7 is a workflow 700 illustrating various aspects of some embodiments of the present invention. Included in the workflow are various aforementioned advantages of the present invention: 1) program code (executed by a processing resource in an embodiment of the present invention) continuously updates solution patterns (e.g., machine learn); 2) program code identifies and memorializes (for use in mitigation) solution patterns for other components that may be failing after the program code performs an analysis of known errors and solutions; and 3) program code utilizes a cognitive, rather than a manual, method of mitigating software errors.

Returning to FIG. 7, in some embodiments of the present invention, program code, executed by at least one processing resource, obtains both issues and solutions to address these issues (710). The solutions to address the issues may be stored in a database, including but not limited to, an external memory resource that is accessible to the program code and can become, as it is updated, a shared knowledge base for users and resources in a distributed computing environment. In some embodiments of the present invention, the program code performs a cognitive analysis of the issues and solutions and identifies one or more components of a distributed system to evaluate for issues (720). The program code can provide data comprising issues and respective solutions to a cognitive analysis tool, including but not limited to, Watson. The program code can provide the cognitive analysis tool with the issues and solutions and in return, obtain a checklist of the one or more components to evaluate. To determine what components the program code evaluate (for health), the program code performing the cognitive analysis may utilize various attributes of the components that comprise the distributed system. For example, past performance of certain components may suggest the necessity of a health check at certain intervals. In some embodiments of the present invention, the program code determines that the interval for a health check is approaching and include this component on a checklist for being evaluated for health (i.e., status).

Responsive to identifying (or obtaining, from a cognitive analysis), one or more components, the program code runs a health check on one or more components of a distributed computing system (730). Based on the health check, the program code determines if the status of the one or more components is correct (or if there are any issues) (740). Provided that the status of the one or more components is correct, the program code collects data from the component, related to the health check, and updates the cognitive analysis tools (which can be internal and/or external) (750). As a benefit of embodiments of the present invention is efficiency, should components that the program code checks for health be overwhelmingly of a correct status when checked, the program code is not providing the most efficient checks. Thus, when a status of a component is repeatedly correct at status checks, the program code learns to check this particular component with less frequency. Thus, data related to a component that passes a health check is useful to the program code in future cognitive analyses and provide machine learning for the program code, enabling the program code to plan/provide improved health checks for components in the future. In some embodiments of the present invention, the program code provides the collected data to a cognitive analysis tool (e.g., Watson).

In some embodiments of the present invention, if the program code determines that the status of the one or more components is incorrect, the program code attempts to fix the status by utilizing the issues and solutions data to identify the incorrect status as being caused by one or more issues and applying a respective one or more solutions to the one or more issues (760). The program code determines if the error was corrected (770). Based on determining that the error was corrected, the program code updates the cognitive analysis data (or tool) and the issues and solutions data to reflect attributes related to the mitigation of the error (780). The program code is able to confirm that the solution is accurately reflected in the issues and solutions data and to add additional information that may provide for more efficient approaches to mitigation in the future. As cognitive analyses are utilized to recognize patterns, by providing detailed information about the component, the issue, and the mitigation of the issue, and thus, the checklist, can be improved and made more efficient by the program code after these updates.

In some embodiments of the present invention, the program code determines that the error was not corrected and the program code logs the uncorrected error (785). In some embodiments of the present invention, the program code updates the cognitive analysis data (or tool) and the issues and solutions data to reflect attributes related to the failure to mitigate the error (795).

Figure 8:
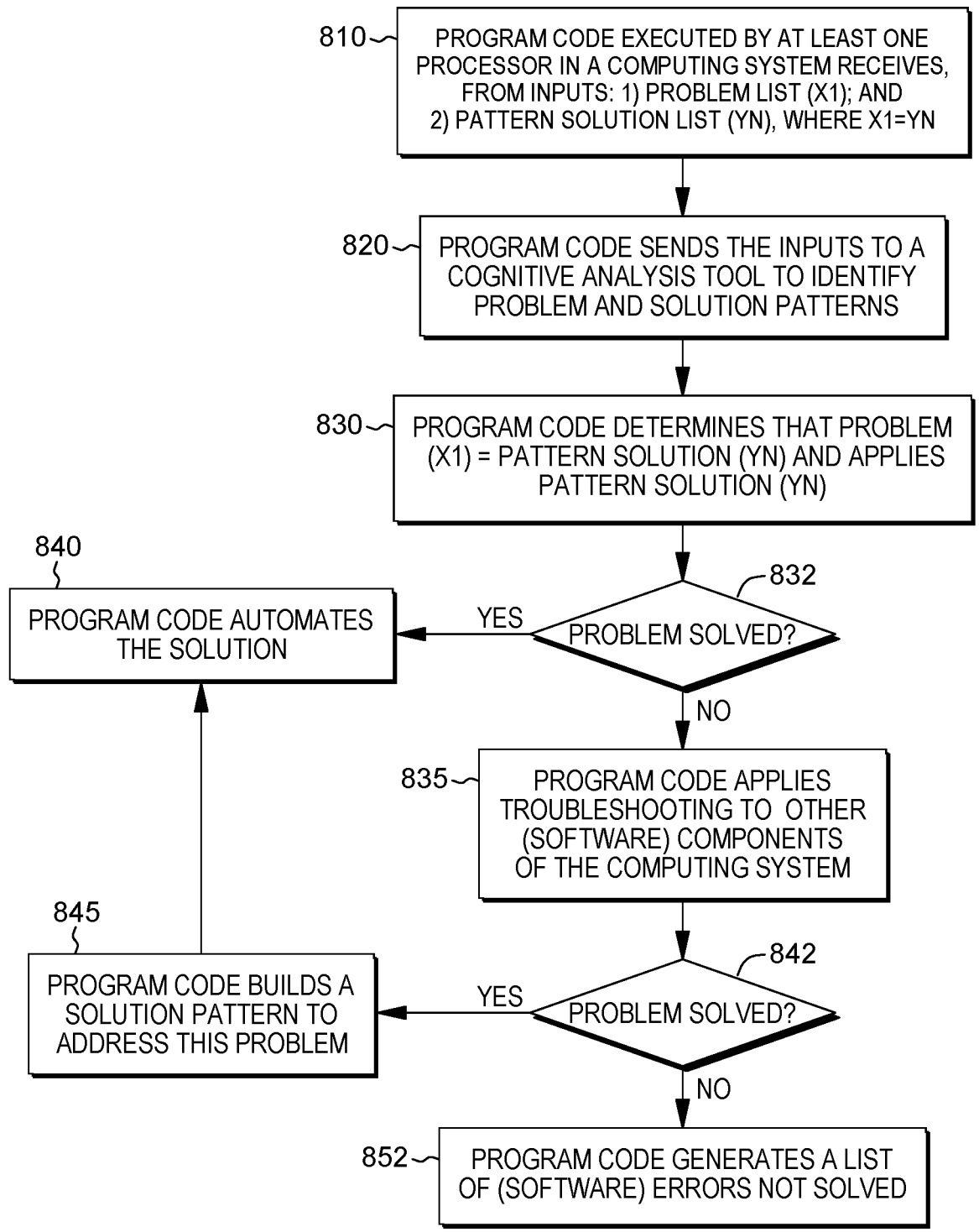
FIG. 8 is a workflow illustrating certain aspects of an embodiment of the present invention.

FIG. 8 illustrates another workflow 800 that illustrates aspects of an embodiment of the present invention. This example provides some specifics that are offered for illustrative purposes only. In an embodiment of the present invention, program code executed by at least one processor in a computing system receives, from inputs: 1) Problem List (X1); and 2) Pattern Solution List (Yn), where X1=Yn (810). Program code sends the inputs to a cognitive analysis tool (e.g., Watson) to identify problem and solution patterns (820). If the program code determines that Problem (X1)=Pattern Solution (Yn), then the program code applies Pattern Solution (Yn) (830). The program code determines if the problem is solved (832). If the problem is solved, the program code automates the solution (840). If the problem is not solved, the program code applies troubleshooting to other (software) components of the computing system (835). The program code determines if the troubleshooting addressed the problem (842). Based on the troubleshooting successfully addressing Problem (X1), the program code builds a solution pattern to address this problem (845). The program code generates an automated solution (840). Based on the troubleshooting not addressing Problem (X1), the program code generates a list of (software) errors not solved (852). In some embodiments of the present invention, the problem code may continue troubleshooting until a trial threshold is exceeded.

Figure 9:
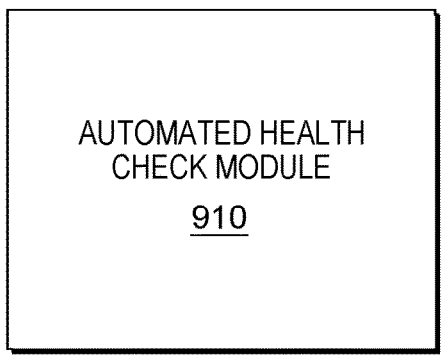
FIG. 9 depicts a modular arrangement of program code to execute various aspects of some embodiments of the present invention.
Figure 9:
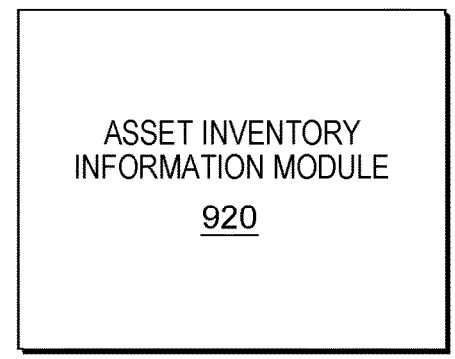
Figure 9:
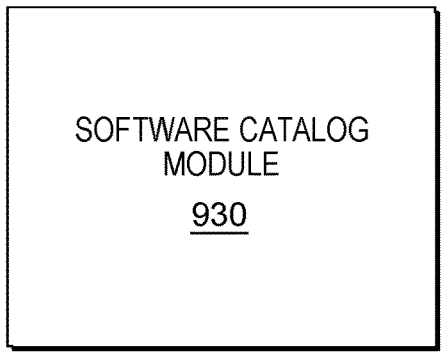
Figure 9:
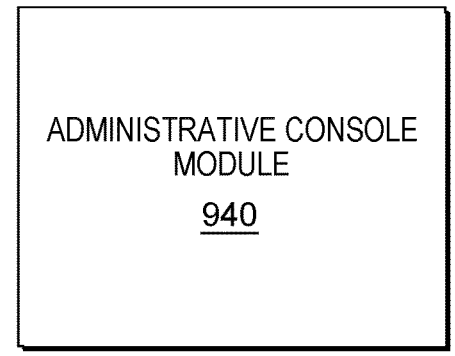
Figure 9:
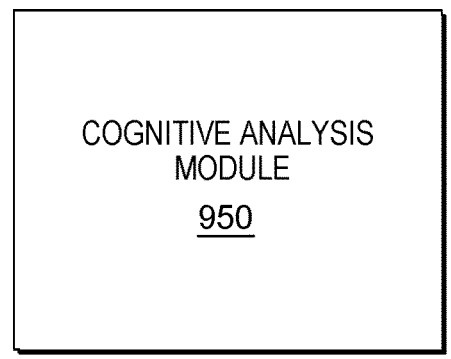

The functionality of some embodiments of the present invention may be provided by one or more software modules. FIG. 9 is an illustration 900 of a modular version of the program in some embodiments of the present invention. Each module provides a distinct functionality in some embodiments of the present invention, which are: 1) an automated computer health check; 2) asset inventory information; 3) a software catalog; and 4) an administrative console.

In an automated health check module 910 of some embodiments of the present invention, program code comprising the module 910 fixes pre-identified software errors either for the operating system, software, and other in-house applications. These tasks include both health check tasks as well as customizable cleanup tasks. The health check tasks can include, but are not limited to: ensuring remote desktop connections to targeted computers, generating alerts related to disk space threshold, providing updates to licensed software, including remote connectivity solutions, validating computer network connectivity, ensuring browser proxy names, ensuring file server connectivity, enabling or disabling the OS firewall, ensuring browser proxy utilization, ensuring addressing for deployment, updating middleware library components, validating database archiving size, maintaining environment visual preferences, validating client versions and definitions, standardizing computing resource security policies, enabling or disabling access ports on individual devices and on the network, validating reporting module connectivity to servers, supporting energy saver mode, validating and enabling OS and application services (on demand), validating and enabling network access control services, scheduling power mode features for network resources, enabling or disabling OS updates, validating and enabling VPN and firewall connectivity, managing a universal printing module, reviewing and enabling computer connectivity to provide resource maintenance including, but not limited to: patch management, software distribution, antivirus update and distribution, and/or asset inventory, and/or scanning installed hardware devices. The customizable cleanup tasks can include, but are not limited to: emptying the recycle bin, removing temporary files, disabling files that will otherwise run automatically, deleting old registry entries, saving or eliminating cookies, updating OS error information, maintaining event viewer logs, maintaining browser histories, maintaining records of recently accessed files, including documents, maintaining OS and file associations, restore and repair packaged files, fix broken links to in software packages.

In some embodiments of the present invention, the automated health check module 910 assigns a unique identifier (or obtains a unique identifier) to associate with a component/task. The program code can utilize this unique identifier to determine: the number of reports opened by a given user, the number of computer incidents/requests related to a component, the owner of the resource with the component, and/or number of software and hardware scans performed on a resource in connection with a health check of a component.

In some embodiments of the present invention, program code that comprises an asset inventory information module 920 performs software and hardware scanning of various components of a computing system. At the completion of scans, the program code exports results to a database, where program code can analyze and track the data for asset inventory or reconciliations processes. In some embodiments of the present invention, the software information scanned and collected by the program code of the asset inventory information module 920 includes, but is not limited to: execution date/time, computer resource name, OS version, user domain, domain name, domain name server, IP address, and/or all software installed on a given physical resource and the versions of the software. In some embodiments of the present invention, the hardware information scanned and collected by program code of the asset inventory information module 920 includes, but is not limited to: serial number, manufacturer, model type, monitor type, monitor serial number, media access control (MAC) address, hard disk size, disk space used, and/or random access memory (RAM) installed. In embodiments of the present invention where the computer resources in the system are localized and the program code can access additional data from resources such as Active Directory and/or OS updates, the program code may also scan the resources to collect one or more of: employee number of user of a given resource, asset tag associated with a given resource, location of a given resource (e.g., building, floor, area), employee contact data, employee type, cost center, and/or asset owner identity.

In some embodiments of the present invention, a software catalog module 930 is an automated, extensive and customizable software module catalog that includes program code to install, uninstall, and/or reinstall software components, including operating system components and third party applications. These tasks, executed by the program code of the software catalog module 930 include automated tasks that the program code may execute at a scheduled date and time. The program code may also defer the tasks and the program code executed in the script (i. e., the comprehensive, end-to-end, solution to issues experienced within a distributed computing environment) and/or may suggest when the tasks should be executed. When the program code of the script executes, as illustrated in FIGS. 2-6, the program code performs data collection, data analysis, and reporting. For example, in some embodiments of the present invention, the checklist script executes in one or more of a silent mode or on demand and as such, performs activities such as OS services restoration and/or installing or removing software. The program code also collects data, including but not limited to, software inventory, hardware inventory, OS system threshold info, and/or computer health (as related to the various components of the computing system relevant to the checklist). The program code may perform a cognitive analysis or provide the collected data to a cognitive analysis tool, to which the data may be uploaded. Based on the analysis by the program code and/or the tool, the program code may provide reporting, including but not limited to, incident avoidance volume reports, predictive and trend information, and/or customer reports. In addition to providing reporting, the program code may update the checklist to automate maintenance of various components of the computing system, based on the reporting results.

Returning to FIG. 9, some embodiments of the present invention may also include an administrative console module 940. A user/administrator may utilize this module to modify and customize the automated checklist script that provides an end-to-end system health solution by adjusting certain attributes. For example, in some embodiments of the present invention, a user may access the administrative console module 940 through a graphical user interface (GUI) on a computing resources that is part of the distributed system to which the checklist is relevant to adjust the installation of the program code (e.g., basic, full version, mobile version, and/or portal). The program code of the administrative console module 940 may enable a user to modify the execution mode (e.g., manual, and/or unattended agent). The user may utilize the administrative console module 940 to schedule the execution of the checklist script and/or adjust reporting log options (e.g., default relational database storage, flat file, and/or the format of the database and/or flat file).

In some embodiments of the present invention, the program code of the administrative console module 940 enables a user to create varied profiles that utilize different attributes and settings when generating and executing the checklist script. The OS and application configuration can be part of a profile generated by the program code. In order to generate a new profile, the program code obtains a set of applications utilized in a given distributed environment (e.g., within a corporation) and the OS configurations for this environment. When the program code executes the script, through this execution, the program code validates and collects the current state of the components that comprise the profile. States validated by the program code can include, but are not limited to, installed, modified, corrupted, and/or unavailable. In a given environment, the profile may be updated (based on changes to the components that comprise the environment) and the checklist script may be updated by the program code to standardize the profile to a given state, including BAU (Business As Usual). The program code can modify components of the system to comport with a BAU state by installing, uninstalling, modifying and/or fixing various components. The amount of profiles utilized in a given system may be unlimited numerically, as rather than modify an existing profile, the user may utilize the program code of the administrative console module 940 to generate a new profile. Various profiles utilized in embodiments of the present invention may be customized in accordance with various environmental factors, including but not limited to: individual, user application/software pool, area, location, country, and/or hardware device profile.

In some embodiments of the present invention, the administrative console module 940 provides various controls for a user, including but not limited to: enabling a user to deter a period for automated software tasks defined in the software catalog module 930, providing general setting to initiate a health check, clean up tasks, and/or wall-to-wall asset inventory, provide access to configure and schedule energy saver plans, provide access to a reporting log generated upon script execution that may include fix execution details, software and hardware inventory information, records of automatic task execution, and/or profile validation reports. In some embodiments of the present invention, the user may access a binary status value that represents whether a fix action was taken by the program code to address an issue. In some embodiments of the present invention, the program code stores the log files in one or more of a file server shared resource (e.g., folder repository) and/or in a database that interacts with a cognitive analysis tool through a connector and sends/receives instructions to support tools and automate processes from the tool. The program code may utilize the logged data to interact with a cognitive analysis tool as well as with third party service support tools. The program code of the administrative console module 940 also provide an interface for a user to add personal data and contact data, including but not limited to mobile phone numbers, social media profile handles, etc. The program code can provide this data, if relevant, to the cognitive analysis.

Some embodiments of the present invention include either a cognitive analysis module 950 or a connection to a cognitive analysis tool, including but not limited to, Watson. In an embodiment of the present invention, the program code of the cognitive analysis module 950 obtains the aforementioned log information (e.g., as a flat file), and stores the data in a shared location (e.g., folder). In some embodiments of the present invention, the program code uploads this data to a cognitive analysis tool. The tool or the program code of the cognitive analysis module 950 generates predictive and trend analysis reports, in some embodiments of the present invention.

Upon completion of the cognitive analysis, program code in some embodiments of the present invention provides an interface to access the results of the analysis. The results are obtained automatically and can also trigger actions by the program code within the system without user intervention. In some embodiments of the present invention, the program code obtains the results of the cognitive analysis. Based on the analysis results, the program code takes an action within the distributed computing environment. In some embodiments, the actions include, but are not limited to: fixing an issue (e.g., antivirus update, patching), sending updated asset inventory information to an asset management tool, sending an execution task to one or more health check programs (e.g., generating and sending a ticket to a support specialist through a helpdesk program).

Figure 10:
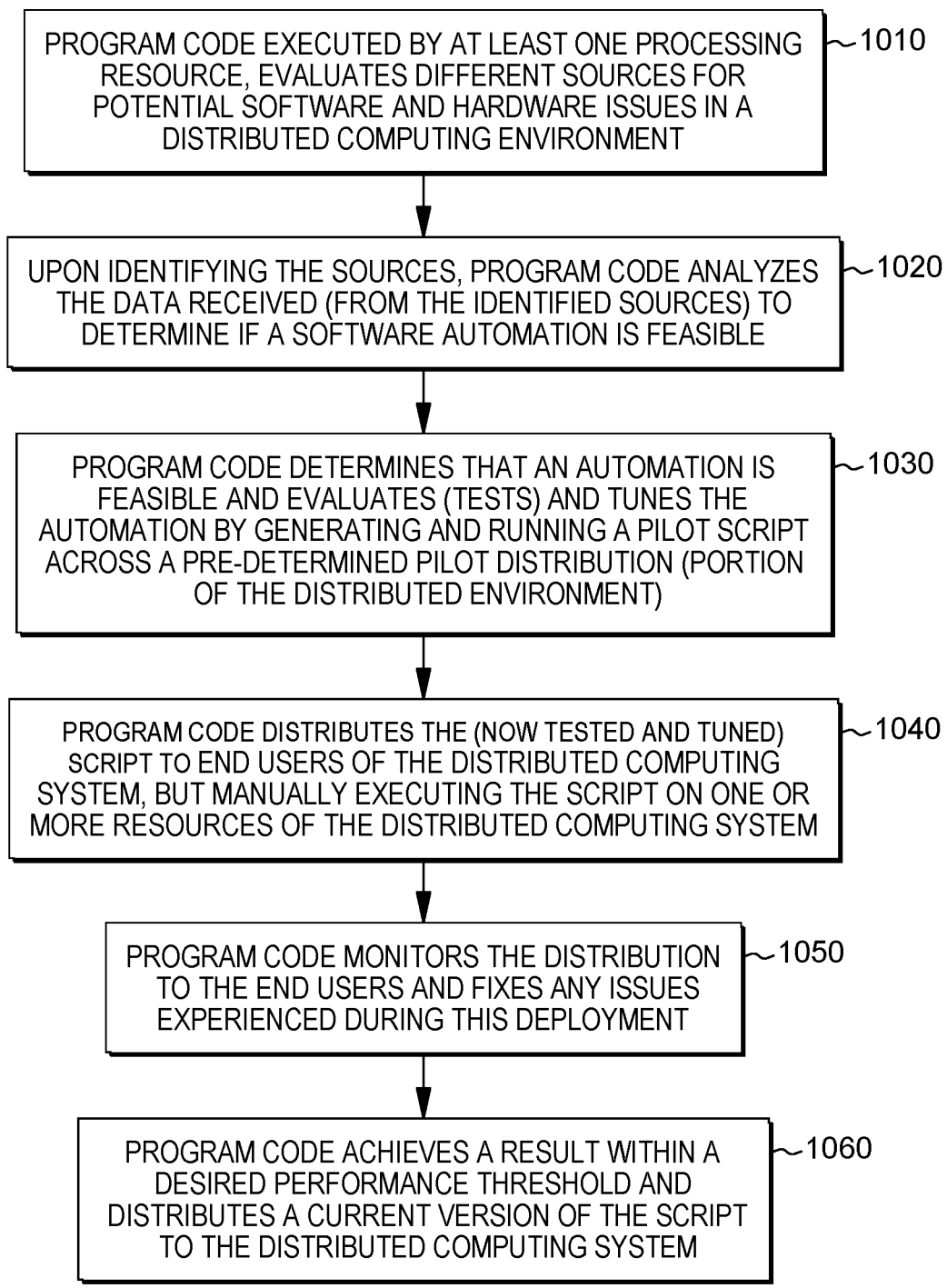
FIG. 10 is a workflow illustrating certain aspects of an embodiment of the present invention.

FIG. 10 is a workflow 1000 that illustrates aspects of certain embodiments of the present invention utilized to automate processes that mitigate potential software and hardware issues in a distributed environment. All of these functionalities can be understood as parts of the script generated and utilized in some embodiments of the present invention. In some embodiments of the present invention, the program code executed by at least one processing resource, evaluates different sources for potential software and hardware issues in a distributed computing environment (1010). In evaluating the sources, the program code identifies incident volume information, calls received at a service desk, defect prevention investigation results, current mean time to resolve required to solve a software issue and costs associated (both processing and capital) with this timing. Upon identifying the sources, the program code analyzes the data received (from the identified sources) to determine if a software automation is feasible (1020). In making this determination, the program code may evaluate expected cost reductions (labor, full time equivalents (FTEs)), potential savings, processing and efficiency impacts, etc. Other factors weighed by the program code when making this determination may include current packages and tools accessible to the program code that the program code could reuse to reduce code development times.

In an embodiment of the present invention, the program code determines that an automation is feasible and evaluates (tests) and tunes the automation by generating and running a pilot script across a pre-determined pilot distribution (portion of the distributed environment) (1030). As part of the evaluating, the program code may progressively customize the pilot script, based on data received and/or the results of the evaluations. As part of the evaluating for issues addressed by the pilot script, the program code generates an expected mean time to resolve new data and compares this mean to a known current time to fix manually. Thus, the program code compares the timing for a manual fix to the timing for utilizing an automated script applied through a remote distribution. When the program code has evaluated and tuned the script sufficiently to realize a performance benefit to distributing the automated solution, the program code distributes the (now tested and tuned) script to end users of the distributed computing system, but manually executing the script on one or more resources of the distributed computing system (1040).

The program code monitors the distribution to the end users and fixes any issues experienced during this deployment (1050). The program code achieves a result within a desired performance threshold (e.g., based on metrics, customer feedback, savings and incident reduction reports indicating improvements, and other type of reports requested by the end users indicating improvements) and distributes a current version of the script to the distributed computing system (1060). By implementing this current version, the program code has implemented a process improvement phase, which subsequent to executing the script, based on an analysis of the results, delivers script releases and enhance new software automation components to program code comprising a health check feature, and reports or develops new connections to other support tools, in order to escalate issues and trigger various responses.

Because aspects of embodiments of the present invention contribute to an end-to-end systems maintenance and issue mitigation solution, which includes software and hardware asset management, utilizing these aspects provides advantages across the system, to various users as well as software and hardware comprising the distributed environments where there aspects are implemented. Benefits in implementing embodiments of the present invention are realized by customers (users) of resources in the distributed system, support personnel for the resources of the distributed system, security of the distributed system itself, and/or asset management capabilities of the system.

From the perspective of a customer, aspects of some embodiments of the present invention provide advantages over existing solutions (which are not as complete or comprehensive), including, but not limited to, enhancing the customer experience increasing customer satisfaction, increasing customer productivity by avoiding software failures in the computers, avoiding disruptions that would impact productivity based on scheduled or deferred execution of the program code (i.e., allowing the script to run in different time periods to avoid bandwidth issues or computer disruptions), and/or preserving environment-wide policies on the individual resources comprising the distributed system.

Implementing aspects of embodiments of the present invention also benefit administrative personnel (e.g., helpdesk, technicians, etc.). For example, in some embodiments of the present invention, the script that comprises some embodiments of the present invention executes in minutes (e.g., two minutes, ten minutes), depending on the implementation, increasing the productivity of the support personnel by providing results and automated fixes within a short time period. When compared with a manual health check, utilizing the automated aspects of the present invention to identify and mitigate issues may constitute a timing improvement of approximately 87%, reducing health check execution, in one example, from twenty-three (23) to two (2) minutes. The automated aspects of the program code assist the technicians by reducing software and application maintenance time, and/or reduce the operational cost reduction (e.g., labor, translation). In one implementation of an embodiment of the present invention, which is offered as an illustrative example, only, five (5) accounts in which the script was implemented avoided approximately twenty thousand (20,000) events that may have become potential incidents. The program code executed by the script in this embodiments of the present invention, standardized fifteen thousand (15,000) computer configurations, which created a significant amount of manual maintenance work for support staff, potentially reducing call volume to helpdesks and the productivity of specialists.

Implementing aspects of the present invention into a distributed system also benefits security of the system as a whole. Executing the automated script in embodiments of the present invention serves to standardize resources across the system, eliminating security risks inherent when computing resources have a diversity of profiles. The program code in embodiments of the present invention ensures computer operating system and applications standardization, by applying a computer profile in a validation process. The standardization and health check of the components by program code in embodiments of the present invention reduces security vulnerabilities, including but not limited to virus and malware infections, and/or computer compliance risks. In embodiments of the present invention, the reporting by the program code provides additional intelligence regarding the implementation of security computer policies in the environment.

By integrating asset management into a single end-to-end solution, embodiments of the present invention offer more comprehensive data and benefits in this area. Some embodiments of the present invention utilize a database to validate data from other asset inventory programs. The interconnectivity of the systems serves to facilitate the asset tracking.

For example, the program code may communicate with a third party solution to obtain the asset tag and physical information for resources of the distributed system. Additionally, embodiments of the present invention provide frequent and current asset information as the program code obtains asset inventory information with the same frequency as it executes the checklist script.

Embodiments of the present invention include a computer-implemented method, a computer program product, and a computer system, which include program code executing on at least one processing resource that obtains data comprising issues and respective issue resolution plans for the issues experienced in a distributed computing system. The program code cognitively analyzes the data to identify components of the distributed computing system for status evaluation, wherein the identifying is based on recognizing patterns in the data through the cognitive analysis. Based on identifying the components, the program code generates, based on the cognitive analysis and on the data, a script to perform a health check on the components and to automatically resolve performance issues of the components identified during the health check. The program code executes the script, wherein the executing comprises, for each components of the components identified in the script. The program code determines, by performing a health check on the component, if a status of the component indicates a performance issue. Based on determining that the status of the component does not indicate a performance issue, the program code updates a certain portion of the data utilized in the cognitive analysis, wherein the portion is relevant to one or more of the status, the procedures, or the component. Based on determining that the status of the component does indicates a performance issue, the program code attempts to resolve the status by: utilizing procedures in the script based on the data comprising the issues and the respective issue resolution plans relevant to the component; determining if the status was resolved by the procedures; based on determining that the procedures resolved the status, updating a portion of the data utilized in the cognitive analysis, wherein the portion is relevant to one or more of the status, the procedures, or the component; and based on determining that the procedures did not resolve the status, logging one or more errors related to the status, and updating, by the one or more processors, the portion of the data.

In some embodiments of the present invention, the program code, upon completion of the executing, cognitively analyzes the data, to identify certain components of the distributed computing system for status evaluation. The program code generates, based on the cognitive analysis and on the data, an updated script to perform a new health check on the certain components and to automatically resolve performance issues of the certain components identified during the new health check.

In some embodiments of the present invention, to perform a cognitive analysis, the program code transmits the data to a cognitive analysis tool. The program code obtains results from the cognitive analysis tool.

In some embodiments of the present invention, the script comprises a checklist of the components and timing for health checking each of the components.

In some embodiments of the present invention, the program code executes the script by intermittently executing the script as a background process.

In some embodiments of the present invention, the program code executes the script responsive to obtaining an instruction to execute the script.

In some embodiments of the present invention, the program code obtains the logged errors. The program code identifies for each logged error, a specific component of the distributed computing system related to the logged errors. The program code determined, based on the data, for the specific component, an escalation procedure to request assistance for resolving the status of the specific component. The program code executes the escalation procedure. In some embodiments of the present invention executing the escalation procedure includes the program code generating a help ticket, and the program code populating the help ticket in a resource of a helpdesk notification system communicatively coupled to the one or more processors.

Referring now to FIG. 11, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing resources in FIGS. 2-6 can each be understood as a cloud computing node 10 (FIG. 11) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
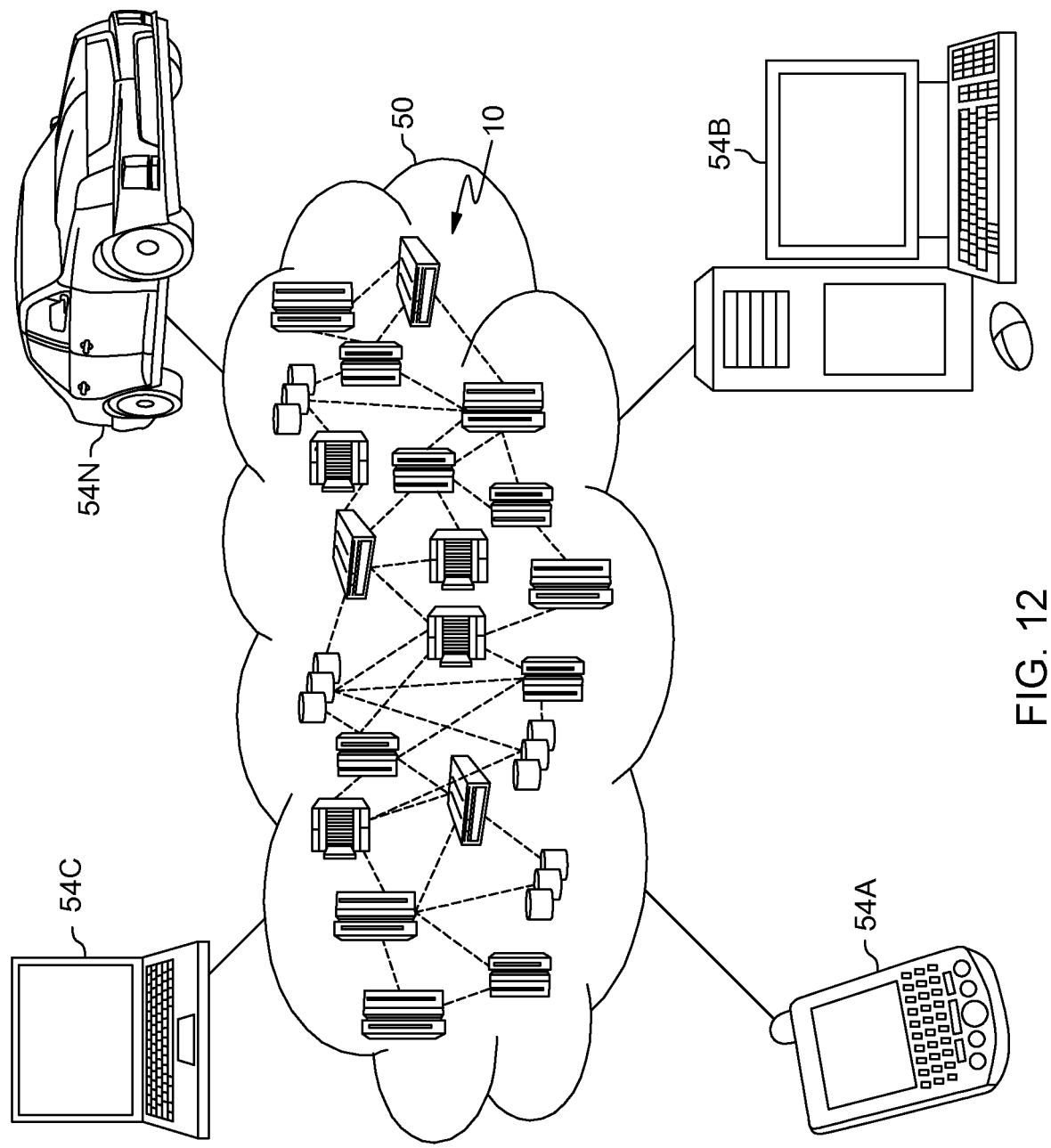
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
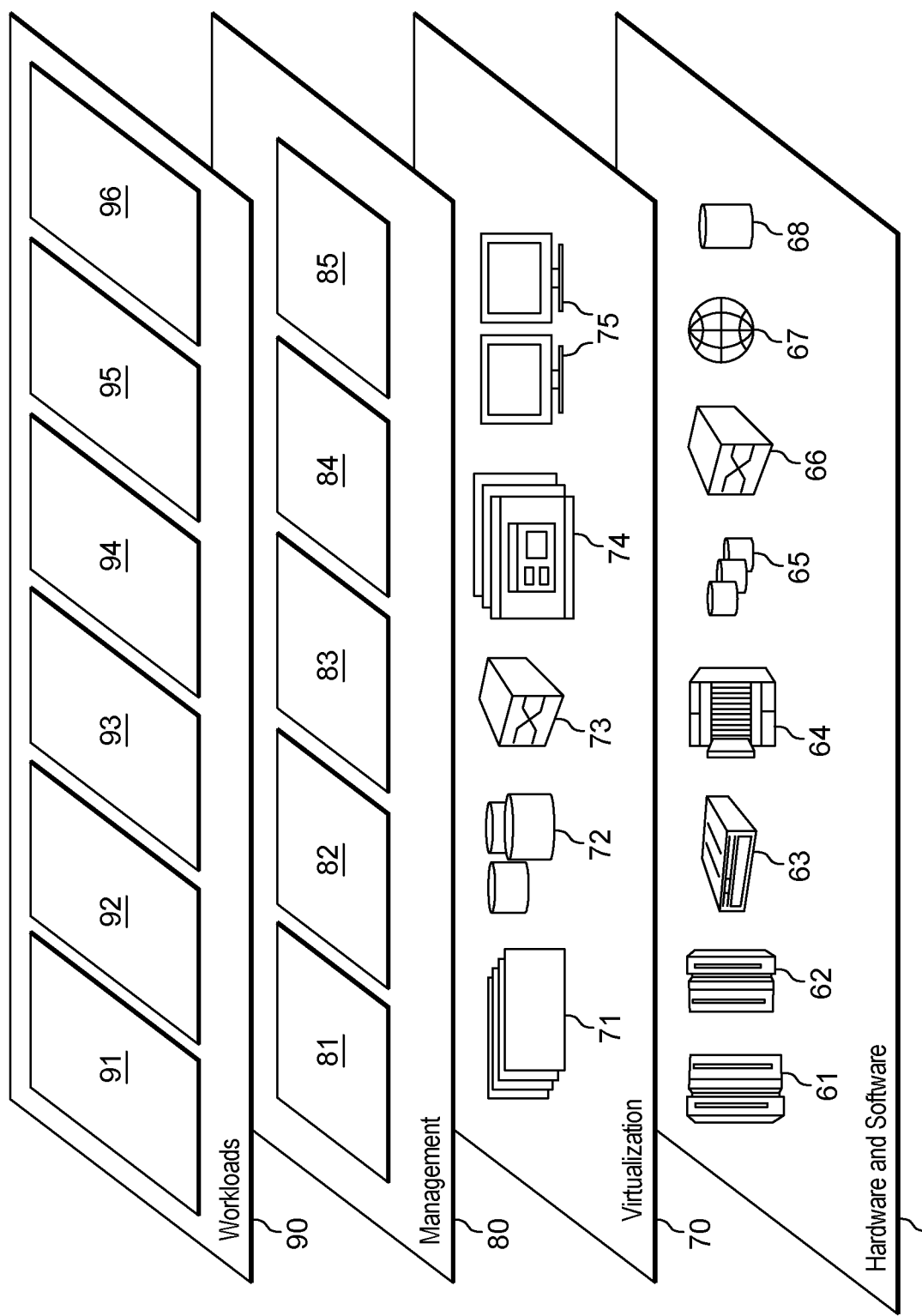
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a process (e.g., electronic checklist), for mitigating issues, both existing and predicted, with various components in a distributed computing system 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:

obtaining, by one or more processors, data comprising issues and respective issue resolution plans for the issues experienced in a distributed computing system;

cognitively analyzing, by the one or more processors, the data to identify components of the distributed computing system for status evaluation, wherein the identifying is based on recognizing patterns in the data through the cognitive analysis;

based on identifying the components, generating, at a given time, and regenerating at later times, by the one or more processors, based on the cognitive analysis and on the data, a single script to perform a health check on the components and to automatically resolve performance issues of the components identified during the health check, wherein the script comprises a checklist of the components and intervals for health checking each of the components, wherein the intervals for health checking for at least a portion of the components is based on past performance of the at least the portion of the components;

executing, by the one or more processors, the script, wherein the executing comprises, for each components of the components identified in the script:

determining, by the one or more processors, by performing a health check on the component, if a status of the component indicates a performance issue;

based on determining that the status of the component does not indicate a performance issue based on the status being correct, updating, by the one or more processors, a certain portion of the data utilized in the cognitive analysis, wherein the portion is relevant to one or more of the status, the procedures, or the component, wherein the updating comprises:

determining whether the status of the component was correct during a threshold number of checks utilizing the checklist; and based on determining that the status was correct during the threshold number of checks, the updating of the certain portion comprises updating an interval for health checking the component, wherein the regenerating the single script after the given time comprises generating a new checklist comprising the updated interval;

based on determining that the status of the component does indicates a performance issue, attempting, by the one or more processors, to resolve the status, the attempting comprising:

utilizing procedures in the script based on the data comprising the issues and the respective issue resolution plans relevant to the component;

determining, by the one or more processors, if the status was resolved by the procedures;

based on determining that the procedures resolved the status, updating, by the one or more processors, a portion of the data utilized in the cognitive analysis, wherein the portion is relevant to one or more of the status, the procedures, or the component; and based on determining that the procedures did not resolve the status, logging, by the one or more processors, one or more errors related to the status, and updating, by the one or more processors, the portion of the data.

2. The computer-implemented method of claim 1, further comprising:

upon completion of the executing, cognitively analyzing, by the one or more processors, the data, to identify certain components of the distributed computing system for status evaluation; and generating, by the one or more processors, based on the cognitive analysis and on the data, an updated script to perform a new health check on the certain components and to automatically resolve performance issues of the certain components identified during the new health check.

3. The computer-implemented method of claim 1, wherein the cognitively analyzing comprises:

transmitting, by the one or more processors, the data to a cognitive analysis tool; and obtaining, by the one or more processors, results from the cognitive analysis tool.

4. The computer-implemented method of claim 1, wherein the executing further comprises intermittently executing, by the one or more processors, the script as a background process.

5. The computer-implemented method of claim 1, wherein the executing further comprises executing, by the one or more processors, the script, responsive to obtaining an instruction to execute the script.

6. The computer-implemented method of claim 1, further comprising:

obtaining, by the one or more processors, the logged errors;

identifying, by the one or more processors, for each logged error, a specific component of the distributed computing system related to the logged errors;

determining, by the one or more processors, based on the data, for the specific component, an escalation procedure to request assistance for resolving the status of the specific component; and executing, by the one or more processors, the escalation procedure.

7. The computer-implemented method of claim 6, wherein executing the escalation procedure comprises:

generating, by the one or more processors, a help ticket; and populating, by the one or more processors, the help ticket in a resource of a helpdesk notification system communicatively coupled to the one or more processors.

8. A computer program product comprising:

a computer readable storage medium readable by one or more processors and storing instructions for execution by the one or more processors for performing a method comprising:

obtaining, by the one or more processors, data comprising issues and respective issue resolution plans for the issues experienced in a distributed computing system;

cognitively analyzing, by the one or more processors, the data to identify components of the distributed computing system for status evaluation, wherein the identifying is based on recognizing patterns in the data through the cognitive analysis;

based on identifying the components, generating, at a given time, and regenerating at later times, by the one or more processors, based on the cognitive analysis and on the data, a single script to perform a health check on the components and to automatically resolve performance issues of the components identified during the health check, wherein the script comprises a checklist of the components and intervals for health checking each of the components, wherein the intervals for health checking for at least a portion of the components is based on past performance of the at least the portion of the components;

executing, by the one or more processors, the script, wherein the executing comprises, for each components of the components identified in the script:

determining, by the one or more processors, by performing a health check on the component, if a status of the component indicates a performance issue;

based on determining that the status of the component does not indicate a performance issue based on the status being correct, updating, by the one or more processors, a certain portion of the data utilized in the cognitive analysis, wherein the portion is relevant to one or more of the status, the procedures, or the component, wherein the updating comprises:

determining whether the status of the component was correct during a threshold number of checks utilizing the checklist; and based on determining that the status was correct during the threshold number of checks, the updating of the certain portion comprises updating an interval for health checking the component, wherein the regenerating the single script after the given time comprises generating a new checklist comprising the updated interval;

based on determining that the status of the component does indicates a performance issue, attempting, by the one or more processors, to resolve the status, the attempting comprising:

utilizing procedures in the script based on the data comprising the issues and the respective issue resolution plans relevant to the component;

determining, by the one or more processors, if the status was resolved by the procedures;

based on determining that the procedures resolved the status, updating, by the one or more processors, a portion of the data utilized in the cognitive analysis, wherein the portion is relevant to one or more of the status, the procedures, or the component; and based on determining that the procedures did not resolve the status, logging, by the one or more processors, one or more errors related to the status, and updating, by the one or more processors, the portion of the data.

9. The computer program product of claim 8, the method further comprising:

upon completion of the executing, cognitively analyzing, by the one or more processors, the data, to identify certain components of the distributed computing system for status evaluation; and generating, by the one or more processors, based on the cognitive analysis and on the data, an updated script to perform a new health check on the certain components and to automatically resolve performance issues of the certain components identified during the new health check.

10. The computer program product of claim 8, wherein the cognitively analyzing comprises:

transmitting, by the one or more processors, the data to a cognitive analysis tool; and obtaining, by the one or more processors, results from the cognitive analysis tool.

11. The computer program product of claim 8, wherein the executing further comprises intermittently executing, by the one or more processors, the script as a background process.

12. The computer program product of claim 8, wherein the executing further comprises executing, by the one or more processors, the script, responsive to obtaining an instruction to execute the script.

13. The computer program product of claim 8, further comprising:

obtaining, by the one or more processors, the logged errors;

identifying, by the one or more processors, for each logged error, a specific component of the distributed computing system related to the logged errors;

determining, by the one or more processors, based on the data, for the specific component, an escalation procedure to request assistance for resolving the status of the specific component; and executing, by the one or more processors, the escalation procedure.

14. The computer program product of claim 13, wherein executing the escalation procedure comprises:

generating, by the one or more processors, a help ticket; and populating, by the one or more processors, the help ticket in a resource of a helpdesk notification system communicatively coupled to the one or more processors.

15. A system comprising:

a memory;

one or more processors in communication with the memory;

program instructions executable by the one or more processors via the memory to perform a method, the method comprising:

obtaining, by the one or more processors, data comprising issues and respective issue resolution plans for the issues experienced in a distributed computing system;

cognitively analyzing, by the one or more processors, the data to identify components of the distributed computing system for status evaluation, wherein the identifying is based on recognizing patterns in the data through the cognitive analysis;

based on identifying the components, generating, at a given time, and regenerating at later times, by the one or more processors, based on the cognitive analysis and on the data, a single script to perform a health check on the components and to automatically resolve performance issues of the components identified during the health check, wherein the script comprises a checklist of the components and intervals for health checking each of the components, wherein the intervals for health checking for at least a portion of the components is based on past performance of the at least the portion of the components;

executing, by the one or more processors, the script, wherein the executing comprises, for each components of the components identified in the script:

determining, by the one or more processors, by performing a health check on the component, if a status of the component indicates a performance issue;

based on determining that the status of the component does not indicate a performance issue based on the status being correct, updating, by the one or more processors, a certain portion of the data utilized in the cognitive analysis, wherein the portion is relevant to one or more of the status, the procedures, or the component, wherein the updating comprises:

determining whether the status of the component was correct during a threshold number of checks utilizing the checklist; and based on determining that the status was correct during the threshold number of checks, the updating of the certain portion comprises updating an interval for health checking the component, wherein the regenerating the single script after the given time comprises generating a new checklist comprising the updated interval;

based on determining that the status of the component does indicates a performance issue, attempting, by the one or more processors, to resolve the status, the attempting comprising:
  utilizing procedures in the script based on the data comprising the issues and the respective issue resolution plans relevant to the component;
  determining, by the one or more processors, if the status was resolved by the procedures;
based on determining that the procedures resolved the status, updating, by the one or more processors, a portion of the data utilized in the cognitive analysis, wherein the portion is relevant to one or more of the status, the procedures, or the component; and
based on determining that the procedures did not resolve the status, logging, by the one or more processors, one or more errors related to the status, and updating, by the one or more processors, the portion of the data.

16. The system of claim 15, the method further comprising:
  upon completion of the executing, cognitively analyzing, by the one or more processors, the data, to identify certain components of the distributed computing system for status evaluation; and
  generating, by the one or more processors, based on the cognitive analysis and on the data, an updated script to perform a new health check on the certain components and to automatically resolve performance issues of the certain components identified during the new health check.

17. The system of claim 15, wherein the cognitively analyzing comprises:
  transmitting, by the one or more processors, the data to a cognitive analysis tool; and
  obtaining, by the one or more processors, results from the cognitive analysis tool.

\* \* \* \* \*